United States Patent [19]

Williams, Jr. et al.

[11] Patent Number: 4,565,716

[45] Date of Patent: Jan. 21, 1986

[54] WATER RESISTANT ALUMINUM PARTICLES AND COATING

[75] Inventors: James E. Williams, Jr., New Kensington; Pamela L. Claassen, Lower Burrell, both of Pa.

[73] Assignee: Aluminum Company of America, Pittsburgh, Pa.

[21] Appl. No.: 510,982

[22] Filed: Jul. 5, 1983

[51] Int. Cl.[4] .......................... C04B 31/40; B05D 7/00
[52] U.S. Cl. ..................................... 427/216; 106/290; 106/308 Q; 427/220; 428/403
[58] Field of Search .................. 417/216; 427/220; 106/290, 308 Q; 428/403

[56] References Cited

U.S. PATENT DOCUMENTS

| | | | |
|---|---|---|---|
| 2,858,230 | 10/1958 | Knoll et al. | 106/277 |
| 2,903,393 | 9/1959 | Allen et al. | 260/960 X |
| 3,181,962 | 5/1965 | Rolles | 106/308 X |
| 3,264,129 | 8/1966 | Rolles et al. | 106/308 X |
| 3,918,984 | 11/1975 | High et al. | 106/308 X |
| 4,350,535 | 9/1982 | Ishijima et al. | 106/308 |

OTHER PUBLICATIONS

Mobil Chemical Product Bulletin, "Virco Pet 40".

*Primary Examiner*—Michael R. Lusignan
*Attorney, Agent, or Firm*—Daniel A. Sullivan, Jr.

[57] ABSTRACT

Metal particles, e.g. aluminum, are treated with ionic organic phosphate, being thereby transformed to a state capable of resisting attack from an aqueous medium. The treated particles may be incorporated into a waterborne coating.

23 Claims, 6 Drawing Figures

WATER RESISTANT ALUMINUM PARTICLES AND COATING

SUMMARY OF THE INVENTION

In a generic aspect of the invention, there is provided a new composition of matter which comprises metal particles which include ionic compound of the formulae of FIG. 1A, 1b, or 1C in an effective concentration to retard the reaction of the metal with water, thereby inhibiting the evolution of hydrogen gas, where, in said formulae, $X = 1$ or 2, $Y = 1$ or 2, and $X + Y = 3$;

where Z is hydrogen or means for neutralizing acid phosphate; and where R is benzo, a halo group, an alkyl group having from 1 to 24 carbon atoms, a cycloalkyl group having from 3 to 20 carbon atoms, an aryl group having from 6 to 40 carbon atoms, a halo substituted aryl group wherein said aryl has from 6 to 40 carbon atoms, an alpha or beta naphthyl, a halo substituted alpha or beta naphthyl, a 3 to 20 carbon atom cycloalkyl substituted alpha or beta naphthyl, an alpha or beta alkyl substituted naphthyl wherein said alkyl has from 1 to 24 carbon atoms, a heterosubstituent substituted aryl wherein said aryl has from 6 to 40 carbon atoms, and said heterosubstituent is selected from the group consisting of CN, $NO_2$, COOH, CHO, OH, a pyridinyl, an alpha or beta furyl, or an alpha or beta thienyl.

Representative examples of means for neutralizing acid phosphate are Na, Li, K, Zn, Mg, Ca and $NH_L(R'')_M$, where $L + M = 4$, $R'' = C_{n''}H_{2n''+1}$, and $n'' = 1$ to 20.

In one aspect of the invention, a pigment paste is provided which comprises a major amount of metal particles such as aluminum flakes treated with compound of FIGS. 1A, 1B, 1C and a minor amount of a compatible liquid. Generally, the compatible liquid used for aluminum flakes in the prior art has been restricted to organic materials such as a hydrocarbon liquid. While a hydrocarbon liquid may indeed be used to form the pastes of the present invention, the surprising resistance to attack by water demonstrated in hydrogen evolution tests indicates the advantageous use in the paste of water (or water as a cosolvent with hydrocarbon liquid) as the compatible liquid. This is desired for various water-based uses, such as water-based paint formulations. The compound-containing metal flakes are obtained, e.g. by milling metal in the presence of the compound to treat the surface of the metal as it is formed into the flakes or by mixing the compound with metal flakes subsequent to milling. The compound-treated metal flakes typically will constitute about 60% to 75% by weight of said pigment paste. For stability against the water reaction, the compound of FIG. 1 to which the metal is exposed is used in an effective amount and preferably (calculated based upon the weight of metal) is at least about 2% by weight.

In a second aspect of the present invention, there is provided a metal pigment which contains metal flakes which contain the compound on their surfaces, said metal pigment including a minor amount of a lubricant.

In a further embodiment, there is provided a coating formulation, such as a metal-pigmented asphalt or paint, which contains the compound-treated metal flakes. In a further embodiment, there is provided metal flakes which generally have a surface area of from about 0.05 to about 15 square meters per gram of metal by weight, which metal flakes have been treated to contain the compound on their surfaces in an effective amount to retard the reaction of the metal with water or other aggressive substances, thereby inhibiting evolution of hydrogen gas that, particularly in a sealed container such as used for paints, could lead to a rupture of the container and degradation of the optical properties of the metal.

DETAILED DESCRIPTION OF THE INVENTION

Besides aluminum and its alloys, other exemplary metals which can be processed according to the present invention are gold bronze (copper-zinc alloys), copper, nickel, magnesium, zinc and alloys of these.

Aluminum particles as contemplated in the invention generally have a surface area which may range from about 0.05 to about 15 $m^2/gm$ of aluminum. The aluminum particles that are specifically contemplated as preferred aspects of the invention are aluminum flakes, powders and granules. In a preferred aspect, the surface area of the aluminum is from about 2 to about 14.5 $m^2/gm$. In the case of aluminum pigment of the leafing type, characterization may alternatively be based on "available covering on water" in the range from 4000 to 100,000 $cm^2/g$. An alternate characterization for non-leafing aluminum pigment is "tinting strength" or "G-value" in the range from 56 to 90.

Figure 1A:
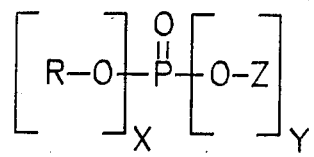
FIGS. 1A, 1B, 1C and 2 to 4 are structural formulae of chemicals for use in the present invention.
Figure 2:
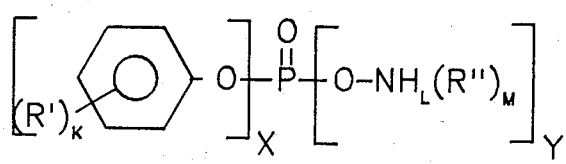
Figure 3:
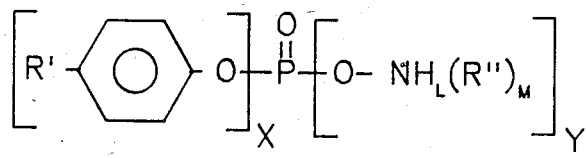

Subsidiary to the above generic aspect of the invention, there is provided a new composition of matter which comprises aluminum particles and an organic phosphate/amine compound at the surface of said aluminum particles. The compound is present in a concentration per surface area effective to retard the hydrogen gas formation caused by the reaction of aluminum with water that would normally occur when the aluminum particles are contacted with water. The compound obeys the formula of FIG. 2 (a species of FIG. 1A), and subsidiary to that, FIG. 3, where $X = 1$ or 2, $Y = 1$ or 2, and $X + Y = 3$;

where $K = 0$ to $5$, $L = 0$ to $4$, $M = 0$ to $4$, $L + M = 4$, preferably $L = 2$, $M = 2$;

where $R' = C_{n'}H_{2n'+1}$, $n' = 1$ to $20$, preferably $n' = 8$ where $R'' = C_{n''}H_{2n''+1}$, $n'' = 1$ to $20$, preferably $n'' = 2$, $R'' = C_2H_5$ The present invention, e.g., provides organic phosphate/amine-stabilized aluminum flake, particularly suitable for pigments which may be used, for example, in paints or coatings for automobiles, and coatings for roofing. The present invention contemplates aluminum flakes which contain a minor amount of lubricant. Contemplated as preferred organic phosphate/amine compounds for treating the aluminum flakes are the following adduct species of the compound as defined generically in the Summary of the Invention: the diethylamine addition product of octylphenyl dihydrogen phosphate, the diethylamine addition product of bis(octylphenyl)hydrogen phosphate, or the diethylamine addition product of a mixture of octylphenyl dihydrogen phosphate and bis(octylphenyl)hydrogen phosphate, as encompassed by the formula of FIG. 4, $X + Y = 3$, $X = 1$ or $2$, and $Y = 1$ or $2$.

A specific product, which contains such preferred adduct and which can be used directly for treating aluminum particles according to the present invention, is sold by Mobile Chemical Company under the trade name Virco-Pet 20. This preferred adduct is discussed generally in U.S. Pat. No. 2,903,393. It contains 80 weight percent (wt.%) organic phosphate/amine adduct and 20 wt.% toluene. It is a tan viscous liquid, miscible with a wide variety of organic solvents. Its product literature contains the table reproduced here as Table I.

TABLE I

| Typical Chemical and Physical Properties | | |
|---|---|---|
| Appearance: | Viscosity: At 100 F., SUS | At 40 C., CS |
| Tan Viscous Liquid | 5000.0 | 1078.7 |
| Odor: | Viscosity: At 210 F., SUS | At 100 C., CS |
| Mild | NE | NE |
| Relative Density: 15/4 C. | Solubility in Water: | |
| 0.98 | Emulsifies | |
| Melting Point: F.(C.) | Pour Point: F.(C.) | |
| NA | NE | |
| Boiling Point: F.(C.) | Flash Point: F.(C.) (METHOD) | |
| NA | 40(4) (ASTM D93) | |
| Vapor Pressure: MM HG 20 C. | PH: | |
| 100.0 | NE | |

NA = Not Applicable;
NE = Not Established;
D = Decomposes

Treatment may be accomplished by mixing the adduct with an existing commercial grade aluminum pigment or by introducing the adduct into the ball mill during manufacture of the pigment.

Rolles U.S. Pat. No. 3,181,962 explains the types of lubricants that may be used in the preparation of aluminum flake to provide both leafing and non-leafing pigments as generally comprising aliphatic fatty acids. The type of lubricant may vary dependent upon whether a leafing or non-leafing pigment is contemplated and the selection of the particular species of lubricant may be made in accordance with the discussion of that patent at column 2, lines 8-27. Other lubricants for non-leafing pigments are explained in Rolles et al. U.S. Pat. No. 3,264,129.

The amount of adduct to present to aluminum flake for maintenance of the optical properties, e.g., reflectance and color, of the aluminum flakes is generally from about 2% to about 15% by weight of the weight of aluminum flakes.

It is to be understood that adduct-treated aluminum flakes prepared in accordance with the invention find wide applicability, particularly in areas where aluminum flakes have been heretofore commercially excluded. Thus, the adduct treatment of the invention provides an enhanced stability for coating compositions incorporating aluminum flakes and containing water such that the aluminum is subject to attack by water. Examples of such coatings are asphalt coatings, automotive coatings, maintenance coatings and product finishes. For example, aluminum flakes have been considered important in the preparation of bituminous coatings for the roofing industry. However, in many bituminous coatings containing water, aluminum flakes react with the water, thereby limiting the application of aluminum flake in these systems.

Water-based paints constitute an area for use that is generally not considered suitable for aluminum flake pigments, particularly not where the pigment is incorporated into the paint long prior to the actual use. For example, it is conventional to provide paints in sealed containers, but the evolution of gas due to the aluminum oxidation, occurring with prolonged contact of aluminum with water, causes the pigment to deteriorate and creates the possibility of container rupture. The resistance to oxidation, manifested through the negative findings in hydrogen evolution tests conducted on the pigments of the present invention, indicates the suitability of the aluminum flakes and pigments of the present invention in water-based paints. Aqueous coating compositions in accordance with the present invention may include ingredients such as shown in High et al. U.S. Pat. No. 3,918,984, granted Nov. 11, 1975.

Typical compositions for water borne coatings have a content of solids from about 10 to about 70 percent, which is made up of the aluminum flakes and other non-volatile components of the coating. A suitable amount of aluminum flake is included to achieve the desired protective and decorative properties of the coating. In the case of coatings involving bituminous emulsions, which contain water, it is to be understood that any of the conventional bituminous bases may be used for the composition of the present invention, including pitch, asphalt, tars and residues of petroleum distillations. Conventional fillers are also contemplated, such as clays, silica, asbestos, talc, magnesia, lime, barium oxide, pulverized slag and sawdust. For further detail, see the *Kirk-Othmer Encyclopedia of Chemical Technology*, Second Edition, Volume 2, particularly pages 778 to 781 and 797 to 798.

The invention is also applicable to aluminum particles used as a foaming agent in the production of foamed concrete. Sometimes the reaction is too fast. This treatment of the present invention retards the reaction. Aluminum particles are also used in water-based adhesives, water-based lubricants, water-containing slurry explosives, and the like. An inhibited, treated aluminum particulate of the invention would find application here also.

For a better understanding of the types of aluminum pigments that have been used in the industry, reference is made to the technical publication, *Alcoa Aluminum Pigments Product Data* [PAP 902, Powder and Pigments, Rev. June, 1982 (Aluminum Company of America)], and to R. Rolles, "Aluminum Flake Pigment", in *Pigment Handbook*, edited by T. C. Patton, Vol. I, pages 785–806, Wiley-Interscience, (1973); the complete texts of both documents are incorporated herein by reference. Pigments which include a lubricant and the adduct treatment of the present invention are specifically contemplated as preferred aspects of the present invention. Such pigments are small, thin flakes of highly polished metal which may be used in roof coatings, maintenance paints, automotive paints, and product finishes. A coating containing aluminum pigments reflects damaging ultraviolet, infrared, and visible light, while it enhances the appearance of the coating material. The manufacture of aluminum pigments is explained in the cited manual, *Alcoa Aluminum Pigments Product Data*, supra at pages 5–6 and the cited publication of Rolles, supra, such techniques being suitable for the present adduct-treated aluminum flakes, including the adduct incorporation in situ by provision of adduct in the initial milling process or adduct addition to an otherwise finished pigment.

In the milling process, ball mills are used, as explained, e.g. at page 798 of the cited Rolles publication, to roll, forge, and burnish aluminum particles into bright, small metallic flakes. The process, and production of the flake product, of the invention can both be carried out in conjunction with this milling. This mill will in general contain mineral spirits (ASTM D 235–77, Type IV) as the liquid medium for the milling process.

Besides milling, the process, and production of, in general, any particulate aluminum product, of the invention can be carried out by contacting aluminum particulates with adduct by the technique of adduct addition to an otherwise finished pigment, this being termed "posttreatment". Posttreatment will typically involve mixing the adduct with the aluminum particulate.

The treated aluminum flakes of the present invention may be substituted for conventional aluminum flakes in aluminum pigments that are sold as pastes with a major amount of aluminum and a minor amount of liquid hydrocarbon, a commercially available aluminum paste having about 65% flaked aluminum and 35% hydrocarbon. In accordance with the present invention, an aluminum paste is contemplated as one aspect of the invention, wherein there is a major amount of aluminum, a minor amount of liquid hydrocarbon such as mineral spirits and from about 5 to about 15% Virco-Pet 20 adduct by weight aluminum. It is, of course, to be recognized that in theory a larger percentage of liquid hydrocarbon could be included in the aluminum paste, but from a practical standpoint it is desirable to have a maximum amount of the aluminum.

It should be appreciated that with the stability against water attack provided by the instant adduct-treated aluminum flakes, an application of the instant invention is found in the area of automobile paints. Automobile uses of aluminum pigments are explained in detail in the technical manual, *Alcoa Aluminum Pigments for Automotive Paint Finishes*, Section FA2C-2, December 1976, Powder and Pigments (December 1976), the entire contents of which are incorporated herein by reference.

It is to be understood that in the generic aspect of the present invention, the amount of aluminum that is included in automobile paints or asphalt compositions may vary to the extent that is desired for the particular end use. In a preferred aspect of the paints and asphalt compositions which are considered below, exemplary ranges are set forth. The stability that is provided against water attack for the aluminum particulates of the invention is a distinct advantage. The aluminum flakes are, in one aspect of the present invention, included in pigmented maintenance coatings, with, for example, from about one to about three pounds of paste per gallon of the total vehicle. Water-based asphalt emulsions also preferably incorporate the aluminum flakes of the present invention, and form a preferred aspect of the present technology. In a typical asphalt formation, an asphalt emulsion contains from about one pound to about three pounds of aluminum paste and preferably from about 1.5 to about 2.5 pounds per gallon. In the case of automotive coatings, the amount of aluminum paste will be typically in the range of 0.1 to 1½ pounds per gallon. It is to be understood that apart from the aluminum flake aspect of the present invention, aluminum particulates which are not milled, as well as dedusted flake powders, may be used in their normal applications, the adduct providing protection for the applications of these aluminum particulates as well.

DESCRIPTION OF PREFERRED EMBODIMENTS

As indicated above, the present invention is based on the discovery that a certain type of phosphorus containing compound effectively stabilizes aluminum pigment from reacting with water, rendering the pigment suitable for use in water based coatings without significant degradation of optical properties. Also, additions of this compound to the present ball mill slurry would minimize oxide formation which causes a reduction in optical properties. Additions of this compound would even permit milling in an aqueous slurry as opposed to an expensive solvent system as is presently used.

Figure 4:
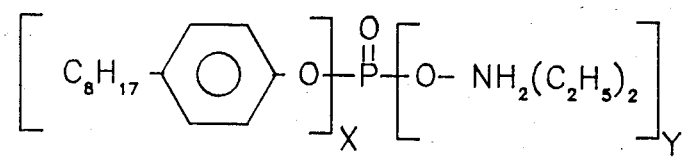

As stated above, a preferred material, which appears to react uniquely with aluminum pigments, is marketed by Mobil Chemical Company under the trade name Virco-Pet 20. It is described as an amine neutralized acid phosphate in a toluene solution. Partly on the basis of U.S. Pat. No. 2,903,393 of Sept. 8, 1959, it is believed this product is a mixture of the diethylamine addition products (adducts) of two acid phosphates: octyl phenyl dihydrogen phosphate and bis(octyl phenyl)hydrogen phosphate. The structural formula of FIG. 4 is believed to be representative of this material.

The following are treatment procedures for a presently preferred method referred to as "cake reduction" where the treatment solution is used to reduce, or dilute, cake to paste. Aluminum pigment in cake form having a preferred non-volatile (NV) content of approximately 80% is charged into a mixer and treated with a solution of mineral spirits and Vicro-Pet 20. Cake ranging from 74% to 81% NV has, however, been treated effectively. The optimum concentration of Virco-Pet 20 appears to be 10% based on aluminum metal weight. Concentrations as low as 3.2% based on aluminum metal weight have been evaluated and provide improved stability over untreated pigments as well as Hydropaste (see e.g., page 803 of the above cited Rolles reference) pigments. Concentrations as high as 15% based on aluminum metal weight have also been evaluated and provide excellent stability. However, it appears that little is gained from the standpoint of stability and optical properties over those obtained using 10% based on aluminum metal weight. The amount of mineral spirits used can vary depending on the desired non-volatiles content of the final product. Tests have ranged from a final non-volatile of 65% to 73%, this being the usual non-volatiles range for what is referred to as paste. The optimum final non-volatile content appears to be in the range of 15% to 73%. Preferably, the mineral spirits and Virco-Pet 20 are employed in solution together.

The aluminum pigment cake and the treatment solutoion of Virco-Pet 20 and mineral spirits are mechanically mixed from 5 to 25 minutes. The mixing time does not appear critical although a minimum of 5 minutes is suggested (1) to ensure uniform distribution of the treatment solution throughout the sample, (2) a uniform metal content throughout the sample, (3) to prevent a separation of the solvent versus metal phase, and (4) to break-up agglomerates of pigment particles potentially generated during the filtering step in the ball mill process stream.

It should be noted that organic solvents other than mineral spirits could be employed, since Virco-Pet 20 is soluble in a number of such solvents. However, mineral spirits is preferred, it being presently used in the manufacture of the majority of aluminum pigments and widely accepted commercially. A combination of solvents such as high flash naptha and mineral spirits would also be acceptable and has been shown by experimentation to work. Other solvents might include isopropanol, butyl cellosolve, butyl carbitol, toluene, xylol, acetone, or any number of other organic solvents used in the coatings industry. Although Virco-Pet 20 forms an emulsion with water, such does not preclude the use of water as a solvent. It is thought that if a coupling solvent, a wetting agent or surfactant, or if sufficient time is provided, or any means of contacting the aluminum surface with the compound is provided, effective inhibition of the aluminum would result.

Although the preferred treatment method, the cake reduction method, here calls for mixing a solution of mineral spirits and Vicro-Pet 20 with aluminum pigment having a higher non-volatile (NV) content than the final product after treatment, laboratory evaluation shows that, as another method, undiluted Vicro-Pet 20 can be added directly to cake (80% NV) or paste (65% NV) with somewhat improved stability over untreated controls. However, experiments in which Virco-Pet 20, undiluted with mineral spirits, is added directly to aluminum pigment cake or paste having a non-volatile ranging from 65% to 81% show poorer stability as well as erratic test results as compared to the cake reduction method. It is theorized that mixing Virco-Pet 20 directly with aluminum pigment having a non-volatile of 65% to 81% results in nonuniform coverage of the high surface area pigment by the inhibitive compound. Although such a treatment can provide stability for a period of time, eventually reaction might occur. Laboratory experimentation has also shown that a slurry treatment method is effective in stabilizing the aluminum pigment. In the slurry treatment, the aluminum particles such as powder or pigment in the form of cake or paste is treated with an excess amount of the mineral spirits and Virco-Pet 20 solution for a period of time such as 5 minutes to 30 minutes. Following the treatment period, the slurry would be filtered to a final product non-volatile ranging from 65% to 80%. Although the slurry treatment concentration was well in excess of 10% Virco-Pet 20 based on aluminum weight, it is felt that concentrations as low as 3% based on aluminum weight would be effective. Although no lower limit has been established in this work from the standpoint of incremental improvements in stability, a lower limit of 0.1% based on aluminum weight is identified as practical.

In addition to the three posttreatment methods of treating aluminum particles given in the preceding paragraph (i.e. the cake reduction method, the undiluted Virco-Pet 20 addition method, and the slurry treatment method, a fourth method is to introduce Virco-Pet 20 into the ball mill, thus inhibiting the pigment or stabilizing the aluminum surfaces as they are being generated. This ball mill in situ treatment is very similar to the slurry treatment in that an excess of treatment solution is used. Two differences between in situ milling and slurry treatment are that during milling nascent aluminum surfaces are created for reaction with the treatment compound and the reaction media is at a somewhat elevated temperature. The maximum ball mill temperature, however, is controlled at 60°–63° C. (140°–145° F.). Although experimentation was conducted at room temperature for slurry treatment, approximately 24° C. (75° F.), a higher temperature in the ball mill, such as the maximum temperature, should not be deleterious to the stabilization of the aluminum pigment or to the resultant optical properties.

A preferred step in the process to obtain stabilized pigments is an aging period after the inhibitive treatment is applied. Two weeks at room temperature is a preferred minimum aging period. It is believed that this period is required in order to provide sufficient time for (1) the adduct to migrate, wet, and penetrate the layer of mineral spirits, fatty acid lubricant, and aluminum stearate or reacted soap film near or on the surface of the aluminum particle, (2) for completion of the reaction of the adduct with the aluminum surface and (3) to allow adduct, as a mobile inhibitor, to migrate on the surface to preferred adsorption sites with preferred orientation of the adduct.

Using a 200° F. distilled water stability test, it was found that pigment tested initially after the inhibitive treatment had a lower stability as compared to aged pigment. The stability did improve with each day of additional aging. Two weeks was found, however, to be a minimum time required to produce a satisfactorily and consistently inhibited product. Longer aging periods did not substantially improve the stability over those aged for two weeks nor did longer aging allow the use of reduced concentrations of Virco-Pet 20 below the preferred 10% level.

Another series of experimentations involved treated aluminum pastes (65% NV) using the preferred method of treatment (cake reduction), at concentrations of 5%, 7.5%, 10%, and 12.5% of Virco-Pet 20 based on aluminum weight. These samples were tested using the 200° F. distilled water test and showed excellent stability. In addition, following the required aging period, the samples were made into flake powders (100% NV) by putting the pastes into a vacuum oven at 100° C. for one hour. The 200° F. distilled water stability of the resulting treated flake powders were excellent.

The preferred treatment process provided excellent stability regardless of the particular fatty acid used during milling. The inhibitive treatment of the invention does not alter the leafing or non-leafing behavior of the pigment.

Experiments were conducted using pigments of 99.97% and 99.5% metal purity. The invention is equally applicable to pigments of lower metal purity.

A wetting agent such as Atlas G3300, an aryl alkyl sulfonate, may be used to improve dispersion characteristics. It should be noted that 2-13% G3300 based on aluminum weight is added to the inhibited pigment of the invention prior to testing in accelerated test solutions as well as prior to dispersing in asphalt emulsion.

EXAMPLES

In the Examples which follow, the effects of process variables on product stability were quantified with three tests. The first test, termed the "200° F. distilled water stability test", screens samples by measuring the volume of hydrogen liberated by deionized water at 200° F. through the reaction:

$$2Al(paste) + 6H_2O \rightarrow 2Al(OH)_3 + 3H_2 \quad (1)$$

over a six-hour period following a one-hour induction period. Hydrogen was allowed to escape during the induction period and only collected in the subsequent six-hour period. In the second test, the paste was mixed in roof coating asphalt emulsion Koppers 460 and placed in a sealed bomb at 125° F. Pressure was measured as a function of time. For the third test, the emulsion/paste mixture was used to coat an aluminum panel and after the material dried, light reflectivity of the coated panel was measured in terms of total reflectance. Total reflectance measurements were made using a Diano TR-1 total reflectometer. This instrument utilizes an integrating sphere principle to sum the light reflected in all directions.

Starting with a homogeneous supply of Alcoa Grade 6230 leafing aluminum pigment paste, a portion was saved as control against which the invention could be measured and the remainder was slurried in mineral spirits (Shell ® Mineral Spirits 145EC) and filtered to a cake with a percentage NV of 76. Using this cake, 75 gram samples were treated with Virco-Pet 20 by thorough hand-mixing with a spatula at 5, 7.5, 10 and 12.5% levels based on aluminum weight in enough mineral spirits to create a 6230-type 65% NV paste. To illustrate the calculations, for the 5% Virco-Pet 20 example, $0.05 \times (0.76 \times 75) = 2.85$ grams of Virco-Pet 20 were used. Included was an extra 10% Virco-Pet 20 sample including addition of Atlas G3300 surfactant. Table IIA lists all pertinent data for these Examples.

TABLE IIA

| Experimental Parameters - For Al Pigment 6230-Type | | | | |
|---|---|---|---|---|
| Example Number | Cake gms | Mineral Spirits Added, gms | Virco-Pet 20 % | gms |
| 1 | 75 | 12.5 | 5 | 2.85 |
| 2 | 75 | 12.5 | 7.5 | 4.28 |
| 3 | 75 | 12.5 | 10.0 | 5.70 |
| 4 | 75 | 12.5 | 12.5 | 7.13 |
| 5 | 75 | 12.5 | 10 | 5.7 + 6% G3300 |

The water stability screening test was conducted by placing 1.5 grams of treated and variously aged paste in a sealed test tube containing 25 cm$^3$ of deionized water maintained at 200° F. temperature. All Virco-Pet 20 treated pastes were mixed with 6% (based on weight of aluminum) G3300 prior to addition of water to ensure good dispersion in test. Gas volume readings were made at the end of six hours for duplicate tests on the same sample. Average results for Examples 1 to 5 are presented in Table IIB as a function of time of aging at room temperature. Also presented in Table IIB are the total reflectance results showing that treatment according to the invention does not degrade optical properties.

TABLE IIB

| | Results | | | |
|---|---|---|---|---|
| | Milliliters H$_2$ Evolved In Test of Material Aged "x" Weeks | | | Total Reflectance, % |
| Example Number | x = 1 | x = 2 | x = 3 | x = 3 |
| Control | 16.4 | 17.5 | — | 41 |
| 1 | 4.5 | 4.8 | 4.1 | 43.4 |
| 2 | 3.6 | 2.5 | 0.7 | 43.0 |
| 3 | 3.5 | 2.3 | 2.0 | 44.7 |
| 4 | 3.4 | 3.2 | 1.8 | 45.1 |
| 5 | 4.3 | 5.5 | 2.6 | 43.6 |

The bomb pressure test was performed by mixing Atlas G3300 wetting agent (in a quantity of 6% based on the weight of aluminum) with the treated paste (aged three weeks) and then mixing with Koppers 460 asphalt emulsion at a paste concentration level of two pounds to a gallon of emulsion. The bomb with the attached pressure gauge was placed in an oven to maintain the 125° F. test temperature. Pressure readings were made daily, in psi gage pressure. Results are presented in Table IIC.

TABLE IIC

| Example Number | Results Pressure (psig) Measured Over a Period of 3 to 17 Days | | | | | | | | | |
|---|---|---|---|---|---|---|---|---|---|---|
| | 3 | 4 | 5 | 6 | 7 | 10 | 11 | 12 | 13 | 14 | 17 |
| 1 | 0.2 | 0.8 | 1.2 | 1.4 | 1.8 | 2.5 | 2.8 | 3.3 | 3.6 | 3.8 | 4.5 |
| 2 | 0 | 0 | 0 | 0 | 0 | 0 | 0 | 0.5 | 0.7 | 0.7 | 1.2 |
| 3 | 0 | 0 | 0 | 0 | 0 | 0 | 0 | 0 | 0 | 0 | 0 |
| 4 | 0 | 0.1 | 0.5 | 0.7 | 0.8 | 1.0 | 1.3 | 1.8 | 2.0 | 2.2 | 2.8 |
| 5 | 0.3 | 0.6 | 0.9 | 1.1 | 1.3 | 1.7 | 1.8 | 2.2 | 2.3 | 2.3 | 3.1 |
| Control | 0.7 | 1.3 | 2.3 | 3.1 | 3.8 | 5.0 | 6.4 | 7.3 | 7.9 | 8.4 | 10.1 |

Using concentrations of 5, 10 and 15% of Virco-Pet 20 additive, samples of Alcoa Grades 7470 and 1595 non-leafing aluminum pigment were treated as follows: samples were slurried in mineral spirits, filtered to a cake, then treated by adding mineral spirits mixed with the additive to achieve 65% NV 7470- and 1595-type pastes. Table III lists all pertinent data.

TABLE III

| | Experimental Parameters | | | | |
|---|---|---|---|---|---|
| Example Number | Pigment | Cake % NV | Al gms | Mineral Spirits, gms, To Bring To 65% NV | Virco-Pet 20 % |
| 6 | 7470 | 74.7 | 56.7 | 11.3 | 10 |
| 7 | 7470 | 68.6 | 17.4 | 1.8 | 5 |
| 8 | 7470 | 68.6 | 17.4 | 1.8 | 15 |
| 9 | 1595 | 68.7 | 5.5 | 4.5 | 10 |
| 10 | 1595 | 68.7 | 11.2 | 1.5 | 5 |
| 11 | 1595 | 68.7 | 11.2 | 1.5 | 15 |

Hot water (200° F.) hydrogen liberation test results are given in Table IV. Optical properties of both pigment types were not degraded by the treatment of the invention.

TABLE IV

| Example Number | Results Milliliters $H_2$ x* = 5 |
|---|---|
| 6 | 1.5 |
| 7 | 3.6 |
| 8 | 0.7 |
| 9 | 7.8 |
| 10 | 3.5 |
| 11 | 1.4 |

*As defined in Table IIB, i.e. the treated pigment was aged 5 weeks.

ADDITIONAL EXAMPLE

Aluminum pigments were mixed with iso-octyl acid phosphate, $(C_{10}H_{21}O)_2P(O)(OH)$, as a treatment additive by charging aluminum paste (65% non-volatile) into a paste mixer, adding G3300 surfactant (6% on paste weight), mixing for 5 minutes, adding 3% treatment additive based on metal weight, and mixing for 15 minutes. Alcoa pigment Grades 229, 7374, and 6205 were employed in these treatments.

Borax accelerated stability tests were run. To do this, one gram of particulate aluminum metal was heated under reflux conditions in a 0.01M solution of sodium tetraborate, $Na_{12}B_4O_7$(pH 9.2), at 140° F. over a 6-hour period in an oil bath, during which the quantity of $H_2$ gas evolved was measured. This borax test solution is very aggressive to unprotected aluminum, and the maximum theoretical evolution possible from the 1 gram sample is 1300 ml of $H_2$. Atlas G3300 surfactant was added to the untreated control pigments to insure dispersion.

The amounts of hydrogen evolved by 1 gram of treated and untreated aluminum during 6 hours' testing at 140° F. in the sodium tetraborate (borax) solution are recorded in Table V.

TABLE V

| | | ml $H_2$ EVOLVED DURING 6 HRS. @ 140° F. IN BORAX SOLUTION (pH 9.2) | | | | | | | | | | |
|---|---|---|---|---|---|---|---|---|---|---|---|---|
| | | 229 | | | | 7374 | | | | 6205 | | |
| Additive | G3300 | 1st Test | 2nd Test | 3rd Test | Average | 1st Test | 2nd Test | 3rd Test | Average | 1st Test | 2nd Test | Average |
| Control | Yes | 790 | — | — | 790 | 135 | — | — | 135 | 0 | 0.4 | 0.2 |
| Isooctyl Acid Phosphate | Yes | 0 | 1.5 | 2.4 | 1.3 | 0.6 | 1.0 | — | 0.8 | 1.4 | 0 | 0.7 |

It will be observed that iso-octyl acid phosphate is quite effective in protecting Alcoa pigment Grades 229 and 7374 against reaction with water. No effect was shown on Alcoa Grade 6205, which has an inherent protection against reaction with water.

Use of iso-octyl acid phosphate does lead to decrease in the leafing and total reflectance properties of Alcoa Grade 6205 aluminum pigment.

FURTHER STUDIES ON TOTAL REFLECTANCE

I. Effect of Time on Total Reflectance

On day zero, Alcoa ® Grade 6230 leafing aluminum pigment was treated with 10% Virco-Pet 20 material as in Example 3, supplemented with the inclusion of 6% Atlas G3300 surfactant to provide a test batch of paste. This batch was stored at room temperature (about 72° F., 22° C.). On different numbers of days subsequent to day zero, samples of the batch were mixed into Koppers 460 asphalt emulsion and the resulting mixture applied as coating on panels, dried, and tested for total reflectance. Over time, total reflectance decreases, as shown in Table VI.

TABLE VI

| Total Reflectance versus Time | |
|---|---|
| Day | Total Reflectance |
| 22 | 40.0/39.4 |
| 57 | 36.0/35.2 |
| 85 | 31.3 |
| 128 | 30.6 |

II. Recapture of Initial Total Reflectance

A batch of Alcoa Grade 6230 leafing aluminum pigment (75% NV) was prepared as in Example 3 on day zero and then stored at room temperature. About 325 days later, separate 42.6-gram samples were removed and mixed as follows:

a. Control mixture
  42.6 grams pigment
  3.3 grams mineral spirits
  1.9 grams G3300 surfactant
b. Isostearic mixture
  42.6 grams pigment 3.2 grams Emery ®871 isostearic acid
0.1 gram mineral spirits
1.9 grams G3300 surfactant One day later, the control mixture and the isostearic mixture were thoroughly mixed, each with 202 grams of Koppers 460 asphalt emulsion. The thus-pigmented emulsions were applied as coating on panels, dried, and tested for total reflectance.

The control gave a total reflectance of 30%, thus showing the same degradation as in I. above as compared with the total reflectance shown in Table IIB for Example 3. In contrast, the isostearic mixture measured 42.5% in total reflectance, showing the ability of isostearic acid addition to restore total reflectance.

III. Effect of Various Amounts of Stearic and Isostearic

Using the same starting batch as in II. above, various amounts of stearic acid and isostearic acid, together with mineral spirits and surfactant, were mixed with 100-gram samples of the batch. The mix ingredients and other characteristics are given in Table VII for the stearic acid examples and in Table VIII for isostearic acid. Alcoa Grade 6230 leafing aluminum pigment already has stearic acid on it to impart its leafing characteristic. The amounts of stearic acid in Table VII are in addition to the basic leafing-effective coating of stearic acid. This extra stearic acid was for the purpose of determining whether extra stearic acid might be able to recapture total reflectance in the manner demonstrated for isostearic acid in II. above. The isostearic examples are for the purpose of determining the effect of isostearic concentration and additionally provide experience with different mineral spirits levels.

Following storage overnight, sufficient quantitites of these mixtures to provide 31.2 grams aluminum were mixed with 202 grams of Koppers 460 asphalt emulsion, then coated on panels, dried, and tested for total reflectance.

The total reflectance measurement results are presented in Tables VII and VIII. If there is any effect from extra stearic acid, it would seem to be a negative one. In contrast, the recapture of lost total reflectance by isostearic acid addition is evident, with recapture improving with increasing isostearic addition. In terms of the effectiveness of the isostearic addition in causing recapture, it is better where no supplemental mineral spirits are added.

IV. Accelerarted Testing

A quantity of Alcoa Grade 6230 leafing aluminum pigment of 65% NV was divided into four samples. One served as a control and the others were mixed with Virco-Pet 20 material (VP), isostearic acid (Iso), and butyl alcohol in proportions as shown in Table IX under "Description", always based on aluminum weight.

The aluminum pigment is put in a can and the can put in an oven at 110° F. After various periods of time, the pigment is removed and allowed to cool to room temperature. The pigment is then incorporated into Koppers 460 asphalt emulsion (at 2 pounds aluminum/gallon for a 65% NV) using Atlas G3300 surfactant at 6% based on weight of aluminum.

TABLE IX

| Example No. | Description | Total Reflectance 110° F. after (weeks) | | | |
|---|---|---|---|---|---|
| | | 1 | 2 | 3 | 4 |
| 21136-47A | 6230 control | 40 | 41.3 | 39.0 | 16.4 |
| 21136-47B | Virco Pet 20 at 10% on Al | 22.1 | — | — | — |
| 21136-47C | 10% VP 20 + 10% Iso | 35.8 | 34.5 | 33.9 | 32.9 |
| 21136-47D | 10% VP 20 + 10% Iso + 5% Butyl Alcohol | 35.0 | 32.4 | 31.0 | 31.8 |

After 1 week the reflectance of the treated pigment had been degraded to an unacceptable level.

After 4 weeks the untreated standard product 6230 control had degraded.

Incorporation of isostearic kept total reflectance high compared to tests A and B under the rugged conditions of this test, even after 4 weeks.

While the invention has been described in terms of preferred embodiments, the claims appended hereto are intended to encompass all embodiments which fall within the spirit of the invention.

Figure 1B:
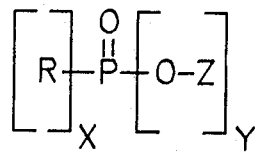
Figure 1C:
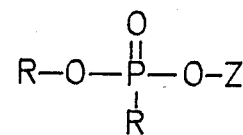

What is claimed is:

1. A composition of matter which comprises metal particles which include compound of the formulae of FIGS. 1A, 1B or 1C in an effective concentration to retard the reaction of the metal with water, thereby

TABLE VII

| | Extra Stearic Acid | | | | | | |
|---|---|---|---|---|---|---|---|
| Example # | % stearic acid* | grams stearic acid* | grams G-3300 | grams mineral spirits* | % aluminum | grams paste = to 31.2 grams aluminum | Total Reflectance |
| 21136-8A | 0.25 | 0.17 | 4.1 | 9.6 | 59.9 | 52.1 | 33.4 |
| 21136-8B | 1.0 | 0.68 | 4.1 | 9.9 | 59.5 | 52.4 | 30.1 |
| 21136-8C | 2.0 | 1.36 | 4.1 | 10.1 | 59.0 | 52.9 | 30.9 |
| 21136-8D | 5.0 | 3.41 | 4.1 | 11.1 | 57.5 | 54.3 | 28.6 |

*In addition to the quantity carried by the 100-gram sample.

TABLE VIII

| | Isostearic Acid | | | | | | |
|---|---|---|---|---|---|---|---|
| Example # | % isostearic acid | grams isostearic acid | grams G-3300 | grams mineral spirits* | % aluminum | grams paste = to 31.2 grams aluminum | Total Reflectance |
| 21136-8E | 1.0 | 0.68 | 4.1 | 9.9 | 59.5 | 52.4 | 32.8 |
| 21136-8F | 5.0 | 3.41 | 4.1 | 11.1 | 57.5 | 54.3 | 36.9 |
| 21136-8G | 10.0 | 6.82 | 4.1 | 12.7 | 55.2 | 56.5 | 39.0 |
| 21136-8H | 1.0 | 0.68 | 4.1 | 0 | 65.1 | 47.9 | 36.7 |
| 21136-8I | 5.0 | 3.41 | 4.1 | 0 | 63.4 | 49.2 | 39.7 |
| 21136-8J | 10.0 | 6.82 | 4.1 | 0 | 61.5 | 50.7 | 41.3 |

*In addition to the quantity carried by the 100-gram sample.

inhibiting the evolution of hydrogen gas, where in said formulae,

X = 1 or 2,

Y = 1 or 2, and $X + Y = 3$;

where Z is hydrogen or means for neutralizing acid phosphate; and where R is benzo, a halo group, an alkyl group having from 1 to 24 carbon atoms, a cycloalkyl group having from 3 to 20 carbon atoms, an aryl group having from 6 to 40 carbon atoms, a halo substituted aryl group wherein said aryl has from 6 to 40 carbon atoms, an alpha or beta naphthyl, a halo substituted alpha or beta naphthyl, a 3 to 20 carbon atom cycloalkyl substituted alpha or beta naphthyl, an alpha or beta alkyl substituted naphthyl wherein said alkyl has from 1 to 24 carbon atoms, a heterosubstituent substituted aryl wherein said aryl has from 6 to 40 carbon atoms, and said heterosubstituent is selected from the group consisting of CN, $NO_2$, COOH, CHO, OH, a pyridinyl, an alpha or beta furyl, or an alpha or beta thienyl.

2. A composition of matter as claimed in claim 1 which comprises aluminum particles which include compound of the formula of FIG. 2 in an effective concentration to retard the reaction of the aluminum with water, thereby inhibiting the evolution of hydrogen gas, where, in said formula, K = 0 to 5, L = 0 to 4, M = 0 to 4, $L + M = 4$, where $R' = C_{n'}H_{2n'+1}$, n' = 1 to 20, and where $R'' = C_{n''}H_{2n''+1}$ n'' = 1 to 20.

3. A composition of matter as claimed in claim 2, wherein said compound has the formula of FIG. 3.

4. A composition of matter as claimed in claim 3, wherein said compound has the formula of FIG. 4.

5. A composition of matter of claim 2, wherein said aluminum particles have a surface area of from about 0.05 to about 15 $m^2$/gm.

6. A composition of matter as claimed in claim 2 wherein the particles comprise flakes.

7. A composition of matter as claimed in claim 1, further comprising a compatible liquid and a surfactant.

8. A method which comprises contacting metal particles with compound of the formulae of FIGS. 1A, 1B or 1C in an effective concentration to retard the reaction of the metal with water, thereby inhibiting the evolution of hydrogen gas, where in said formulae, X = 1 or 2, Y = 1 or 2, and $X + Y = 3$;

where Z is hydrogen or means for neutralizing acid phosphate; and where R is benzo, a halo group, an alkyl group having from 1 to 24 carbon atoms, a cycloalkyl group having from 3 to 20 carbon atoms, an aryl group having from 6 to 40 carbon atoms, a halo substituted aryl group wherein said aryl has from 6 to 40 carbon atoms, an alpha or beta naphthyl, a halo substituted alpha or beta naphthyl, a 3 to 20 carbon atom cycloalkyl substituted alpha or beta naphthyl, an alpha or beta alkyl substituted naphthyl wherein said alkyl has from 1 to 24 carbon atoms, a heterosubstituent substituted aryl wherein said aryl has from 6 to 40 carbon atoms, and said heterosubstituent is selected from the group consisting of CN, $NO_2$, COOH, CHO, OH, a pyridinyl, an alpha or beta furyl, or an alpha or beta thienyl.

9. A method as claimed in claim 8 which comprises contacting aluminum particles with a compound of the formula of FIG. 2 in an effective concentration to retard the reaction of the aluminum with water, thereby inhibiting the evolution of hydrogen gas, where X = 1 or 2, Y = 1 or 2, and $X + Y = 3$;

where

K = 0 to 5,

L = 0 to 4,

M = 0 to 4, $L + M = 4$, preferably L = 2, M = 2;
where $R'C_{n'}H_{2n'+1}$, n' = 1 to 20, preferably n' = 8
where $R'' = C_{n''}H_{2n''+1}$, n'' = 1 to 20, preferably n'' = 2, $R'' = C_2H_5$.

10. A method as claimed in claim 9, further comprising, following contacting, an aging step for developing the ability of the aluminum particles to resist reaction with water.

11. A method as claimed in claim 10, said aging being for about two weeks.

12. A method as claimed in claim 9, the contacting being by the cake reduction method.

13. A method as claimed in claim 9, wherein said compound has the formula of FIG. 3.

14. A method as claimed in claim 13, wherein said compound has the formula of FIG. 4.

15. A metal-particle coating formulation, wherein the metal particles therein comprise a composition of matter as claimed in claim 1.

16. A coating formulation as claimed in claim 15, said coating formulation being a water-borne coating formulation.

17. A coating formulation as claimed in claim 15, wherein the metal particles comprise aluminum particles.

18. A method of using a composition of matter as claimed in claim 1, comprising incorporating said composition of matter in a coating formulation.

19. A method as claimed in claim 18, said coating formulation being a water-borne coating formulation.

20. A method as claimed in claim 18, wherein said composition of matter comprises aluminum particles.

21. A paste comprising a major amount of a composition of matter as claimed in claim 1 and a minor amount of a compatible liquid.

22. A method of using a paste as claimed in claim 21, comprising incorporating said paste in a coating formulation.

23. A method as claimed in claim 22, said coating formulation being a water-borne coating formulation.

* * * * *

UNITED STATES PATENT AND TRADEMARK OFFICE
CERTIFICATE OF CORRECTION

PATENT NO. : 4,565,716

DATED : January 21, 1986

INVENTOR(S) : James E. Williams, Jr. and Pamela L. Claassen

It is certified that error appears in the above-identified patent and that said Letters Patent is hereby corrected as shown below:

Col. 12, line 2   Change "$Na_{12}B_4O_7$" to --$Na_2B_4O_7$--.

Col. 14, line 4   Change "Accelerarted" to --Accelerated--.

Signed and Sealed this

Twenty-fourth Day of June 1986

[SEAL]

Attest:

DONALD J. QUIGG

Attesting Officer

Commissioner of Patents and Trademarks